(12) United States Patent
Zafar et al.

(10) Patent No.: US 9,129,023 B2
(45) Date of Patent: Sep. 8, 2015

(54) CONNECTED ADDRESS BOOK SYSTEMS AND METHODS

(75) Inventors: Shadman Zafar, Plano, TX (US); Brian Roberts, Frisco, TX (US); Donald Relyea, Dallas, TX (US); Heath Stallings, Colleyville, TX (US); Ruchir Rodrigues, Irving, TX (US); Raul Aldrey, Dallas, TX (US); Michelle Felt, Randolph, NJ (US); Jack Hao, Lexington, MA (US); Robert Beckwith, Jersey City, NJ (US)

(73) Assignee: Verizon Patent and Licensing Inc., Basking Ridge, NJ (US)

( * ) Notice: Subject to any disclaimer, the term of this patent is extended or adjusted under 35 U.S.C. 154(b) by 1802 days.

(21) Appl. No.: 12/242,515

(22) Filed: Sep. 30, 2008

(65) Prior Publication Data
US 2010/0083125 A1 Apr. 1, 2010

(51) Int. Cl.
G06F 15/177 (2006.01)
G06F 17/30 (2006.01)
G06Q 10/10 (2012.01)
H04M 3/493 (2006.01)
H04M 1/2745 (2006.01)
H04M 3/42 (2006.01)

(52) U.S. Cl.
CPC .......... *G06F 17/30867* (2013.01); *G06Q 10/10* (2013.01); *H04M 3/4931* (2013.01); *H04M 1/274516* (2013.01); *H04M 3/42365* (2013.01)

(58) Field of Classification Search
USPC .......................................... 715/738, 739, 864
See application file for complete search history.

(56) References Cited

U.S. PATENT DOCUMENTS

| 2008/0082421 A1* | 4/2008 | Onyon et al. ................... 705/14 |
| 2009/0150488 A1* | 6/2009 | Martin-Cocher et al. .... 709/204 |
| 2011/0126263 A1* | 5/2011 | Tadokoro et al. ................. 726/3 |

OTHER PUBLICATIONS

Apple, "MobileMe Contacts", www.apple.com/mobileme/features/contacts.html, accessed Jul. 18, 2008.

* cited by examiner

*Primary Examiner* — Thanh Vu

(57) ABSTRACT

In an exemplary method, contacts data for a network address book is maintained, data representative of at least a portion of a local address book maintained on an access device is received over a network, and the received local address book data is used to perform at least one connected address book operation. In one example in which the contacts data includes data representative of a network address book listing associated with a user, data representative of a persona associated with the user is maintained, a request to access the network address book listing is received, and at least a subset of the data representative of the network address book listing is identified and provided in response to the request and based at least in part on the persona.

18 Claims, 15 Drawing Sheets

Address Book — 505

| Listings | Connection Status |
|---|---|
| Local Listing 510-1 | Connected |
| Local Listing 510-2 | Connected |
| Local Listing 510-3 | Not Connected |
| Local Listing 510-4 | Connected |
| Local Listing 510-5 | Not Connected |
| Local Listing 510-6 | Not Connected |
| Local Listing 510-7 | Connected |
| ⋮ | |
| Local Listing 510-J | Not Connected |

530 (Connection Status column)

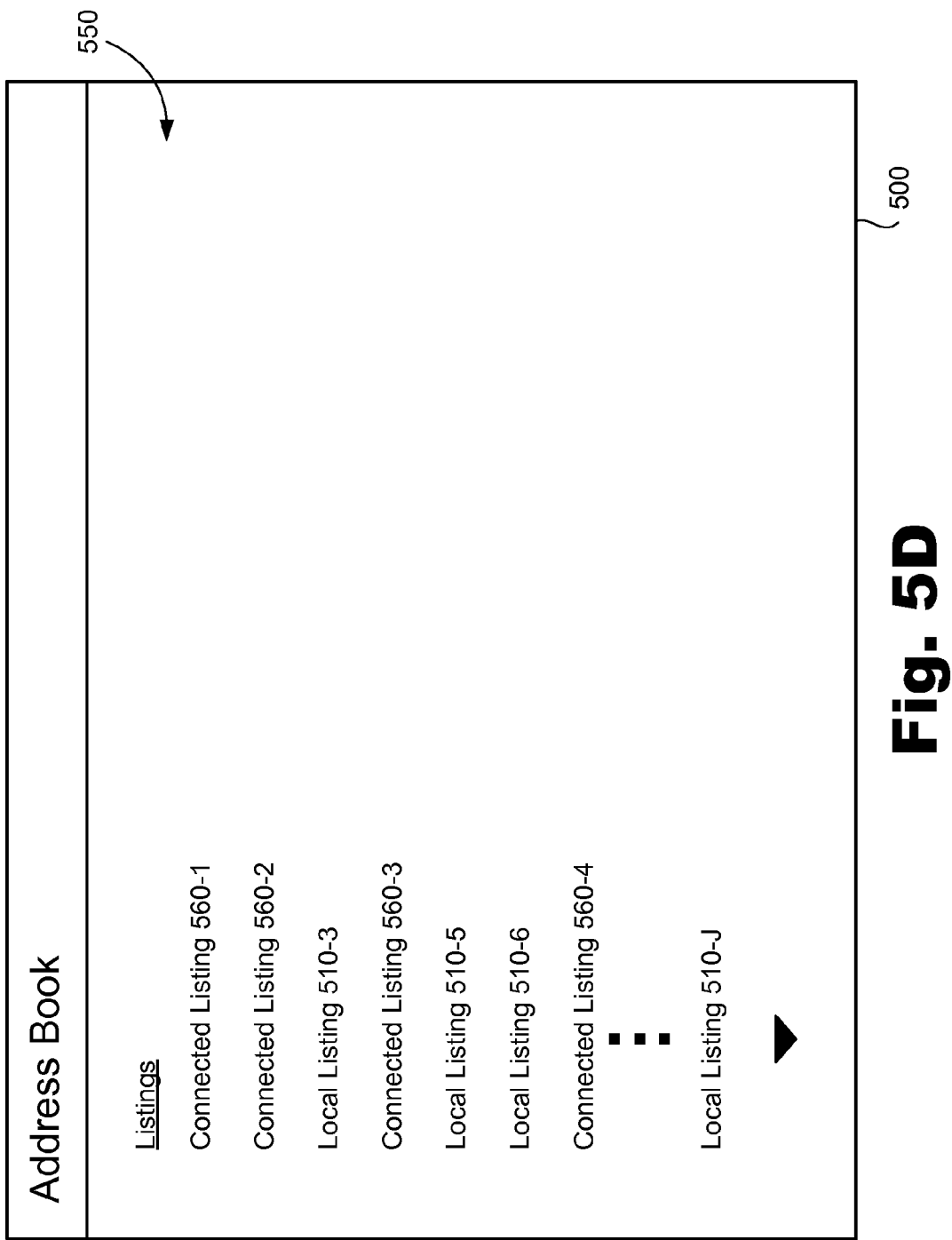

Fig. 7B

CONNECTED ADDRESS BOOK SYSTEMS AND METHODS

BACKGROUND INFORMATION

Advances in electronic communications technologies and devices have interconnected people perhaps better than ever before. To illustrate, mobile phones, which were previously used for voice communications only, are increasingly being used to transmit photographs, video, audio, and/or other content and messages to other mobile phones and to other types of electronic devices.

To assist people in communicating with one another, many communication devices include local address book applications that allow users of the devices to manually input and manage locally stored contact information for people. Such local address book applications have several shortcomings, however. For example, locally maintained address book data can easily become obsolete when contact information for a person changes and the user responsible for maintaining the local address book is unaware of the change or fails to manually update the local address book. As another example, a user may possess several devices each having its own local address book application. It is often time consuming, inconvenient, and/or costly to manually maintain and synchronize address books across multiple devices. In addition, when a user upgrades to a new device, transfer of local address book data to the new device may be time consuming, inconvenient, and costly.

BRIEF DESCRIPTION OF THE DRAWINGS

The accompanying drawings illustrate various embodiments and are a part of the specification. The illustrated embodiments are merely examples and do not limit the scope of the disclosure. Throughout the drawings, identical or similar reference numbers designate identical or similar elements.

FIGS. 5A-5E illustrate a graphical user interface having exemplary address book views displayed therein.

FIGS. 7A-7C illustrate a graphical user interface having exemplary user profile and connected address book management views displayed therein.

DETAILED DESCRIPTION OF PREFERRED EMBODIMENTS

Figure 1:
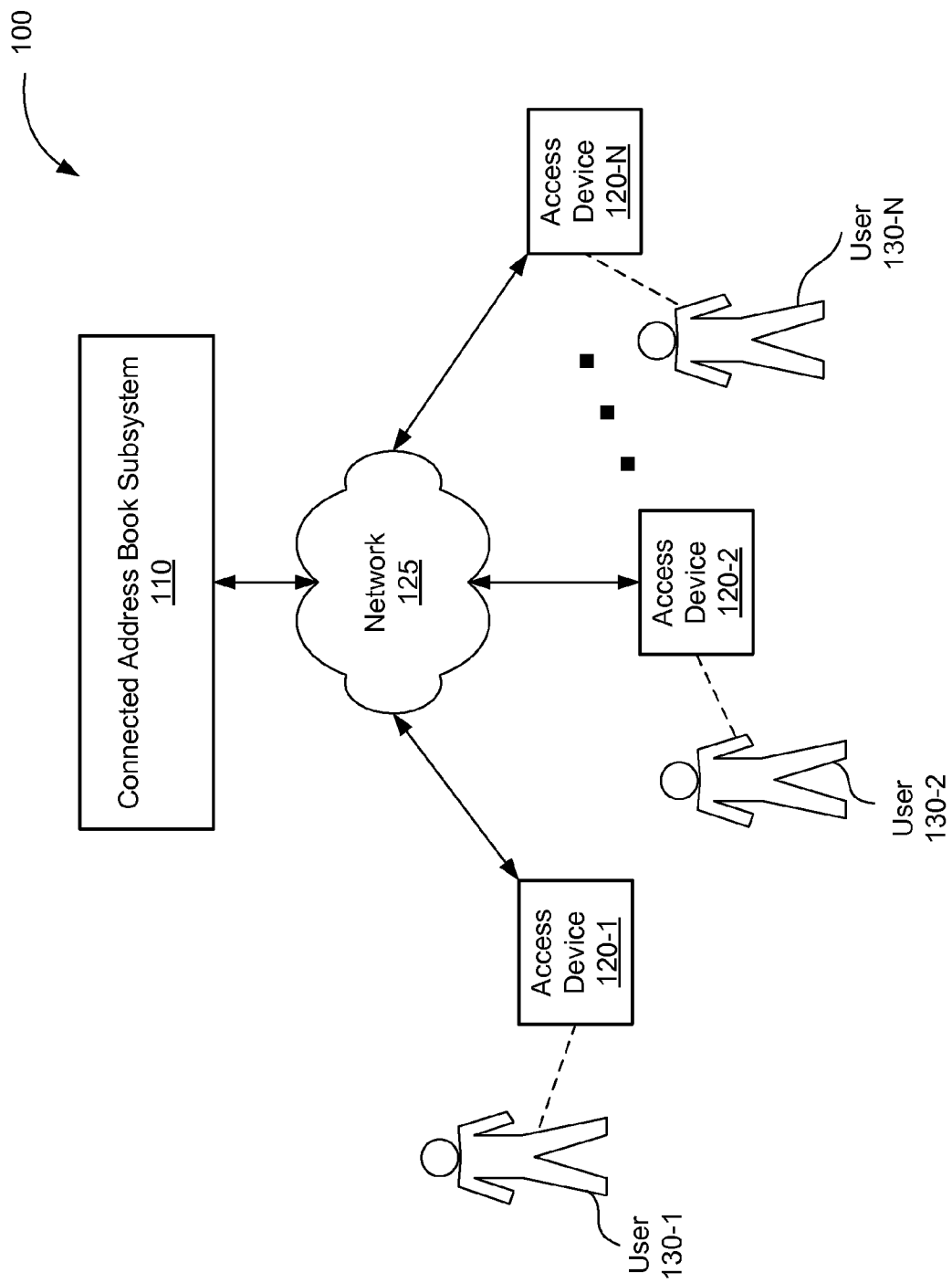
FIG. 1 illustrates an exemplary connected address book system.

Exemplary connected book address systems and methods are described herein.

In an exemplary method, contacts data for a network address book is maintained, data representative of at least a portion of a local address book maintained on an access device is received over a network, and the received local address book data is used to perform at least one connected address book operation. In one example in which the contacts data includes data representative of a network address book listing associated with a user, data representative of a persona associated with the user is maintained, a request to access the network address book listing is received, and at least a subset of the data representative of the network address book listing is identified and provided in response to the request and based at least in part on the persona.

In certain embodiments, the connected address book operation includes identifying at least one listing common to the local address book and the network address book and providing to the access device at least one indication of the common listing. In certain embodiments, the connected address book operation includes converting the local address book to a hybrid address book including at least one local address book listing and at least one network address book listing.

In another exemplary method, contacts data for an address book listing associated with a first user is maintained, data representative of a persona associated with said first user is maintained, a request from a second user to access the address book listing is received, a select set of the contacts data associated with the address book listing is identified in response to the request and based at least in part on the persona, and the second user is provided with access to the select set of the contacts data. In one example, data representative of another persona associated with the first user is maintained, another request to access the address book listing is received from a third user, another select set of the contacts data associated with the address book listing is identified in response to the other request and based at least in part on the other persona, and the third user is provided with access to the other select set of the contacts data.

An exemplary system includes a data store configured to store contacts data for a network address book, a communication module configured to receive data representative of at least a portion of a local address book maintained on an access device, a processing module, and a connected address book module configured to direct the processing module to use the local address book data to perform at least one connected address book operation.

Another exemplary system includes a connected address book module configured to direct a processing module to maintain contacts data for an address book listing associated with a user, and a profile management module configured to direct the processing module to maintain data representative of a user profile associated with the user, the user profile including data representative of a plurality of personas specifying a plurality of different sets of the contacts data. In response to a request from another user to access the address book listing, the connected address book module is configured to direct the processing module to match the other user to one of the personas and provide the other user with access to the set of contacts data specified by the matched persona.

Exemplary embodiments of connected address book systems and methods will now be described in more detail with reference to the accompanying drawings.

FIG. 1 illustrates an exemplary connected address book system 100 (or simply "system 100"). As shown in FIG. 1, system 100 may include a connected address book subsystem 110 selectively and communicatively connected to a plurality of access devices 120-1 through 120-N (collectively "access devices 120") by way of a network 125.

Access devices 120 may be associated with users, which in certain embodiments may be subscribers to or users of one or more services (e.g., a wireless telephone service and/or a connected address book service) provided over network 125.

As an example, FIG. 1 shows users 130-1, 130-2, and 130-N (collectively "users 130") as being associated with access devices 120-1, 120-2, and 120-N, respectively. The exemplary users 130 and their particular associations with access devices 120 are shown for illustrative purposes. Other user associations with access devices 120 may be defined in system 100.

The access devices 120 and the connected address book subsystem 110 may communicate over network 125 using any communication platforms and technologies suitable for transporting data and/or communication signals, including known communication technologies, devices, media, and protocols supportive of remote data communications, examples of which include, but are not limited to, data transmission media, communications devices, Transmission Control Protocol ("TCP"), Internet Protocol ("IP"), File Transfer Protocol ("FTP"), Telnet, Hypertext Transfer Protocol ("HTTP"), Hypertext Transfer Protocol Secure ("HTTPS"), Session Initiation Protocol ("SIP"), Simple Object Access Protocol ("SOAP"), Extensible Mark-up Language ("XML") and variations thereof, Simple Mail Transfer Protocol ("SMTP"), Real-Time Transport Protocol ("RTP"), User Datagram Protocol ("UDP"), Global System for Mobile Communications ("GSM") technologies, Code Division Multiple Access ("CDMA") technologies, Evolution Data Optimized Protocol ("EVDO"), Time Division Multiple Access ("TDMA") technologies, Short Message Service ("SMS"), Multimedia Message Service ("MMS"), radio frequency ("RF") signaling technologies, wireless communication technologies (e.g., Bluetooth, Wi-Fi, etc.), in-band and out-of-band signaling technologies, and other suitable communications technologies.

Network 125 may include one or more networks, including, but not limited to, wireless networks, mobile telephone networks (e.g., cellular telephone networks), closed media networks, open media networks, subscriber television networks, closed communication networks, open communication networks, satellite networks, navigation networks, optical fiber networks, broadband networks, narrowband networks, voice communications networks (e.g., VoIP networks), Public Switched Telephone Networks, the Internet, wide area networks, local area networks, public networks, private networks, and any other networks capable of carrying data and/or communications signals between access devices 120 and connected address book subsystem 110. Communications between connected address book subsystem 110 and access devices 120 may be transported using any one of above-listed networks, or any combination or sub-combination of the above-listed networks.

Figure 2:
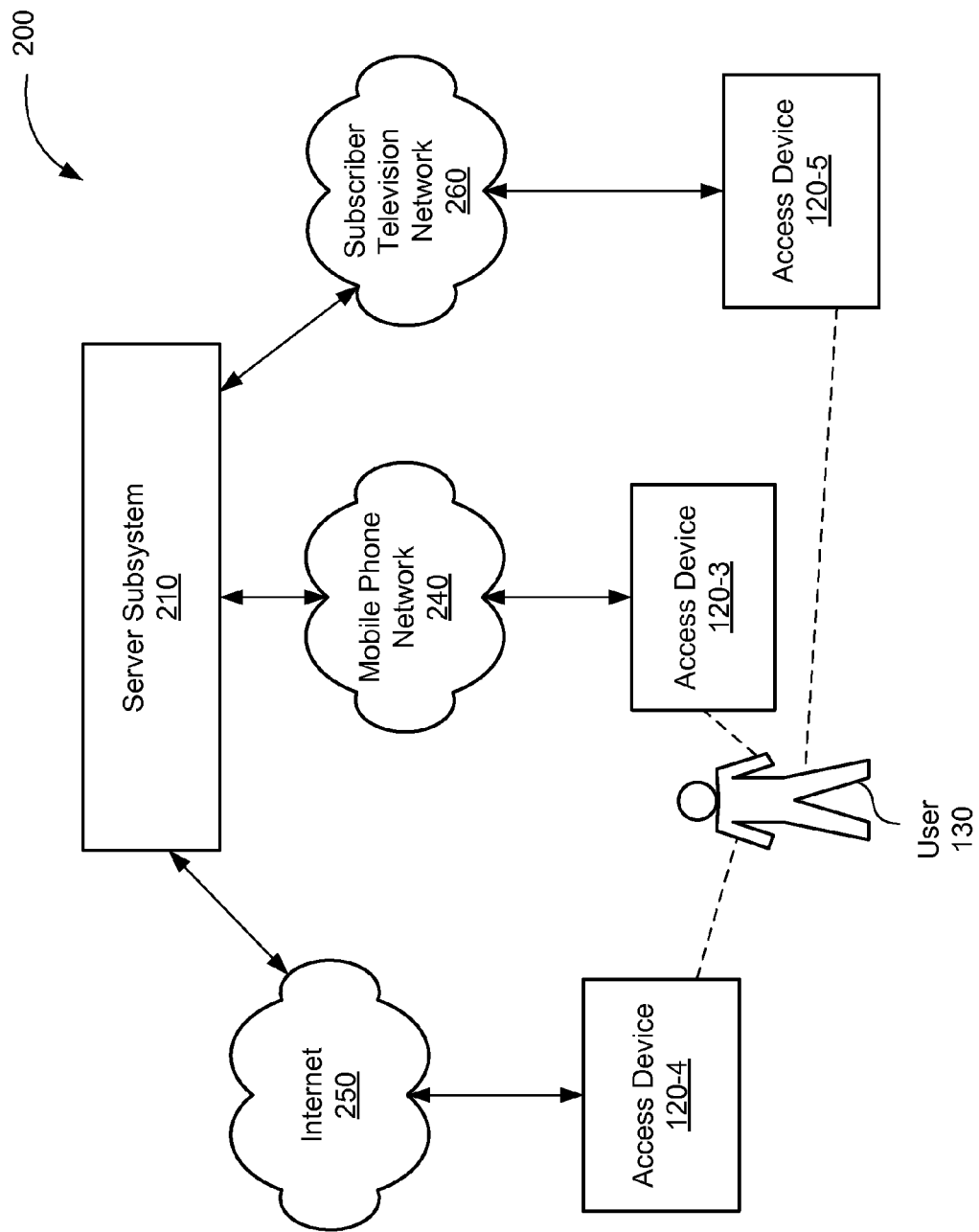
FIG. 2 illustrates an exemplary implementation of the system of FIG. 1.

FIG. 2 shows an exemplary implementation 200 of system 100. As shown in FIG. 2, implementation 200 may include a server subsystem 210 and access devices 120-3 through 120-5 associated with a user 130. Connected address book subsystem 110 may include or be implemented in server subsystem 210, which may be configured to communicate with access devices 120-3 through 120-5 over different network platforms. For example, server subsystem 210 may be configured to communicate with access device 120-3 (e.g., a mobile phone) over a mobile phone network 240, with access device 120-4 (e.g., a personal computer) over the Internet 250, and/or with access device 120-5 (e.g., a set-top box) over a subscriber television network 260. Hence, user 130 may be able to utilize one or more of the access devices 120-3 through 120-5 to provide and/or access content stored within and/or services provided by connected address book subsystem 110. It will be recognized that mobile phone network 240, the Internet 250, and subscriber television network 260 may be part of network 125 shown in FIG. 1. It will also be recognized that the networks shown in FIG. 2 are merely illustrative of the many different types of networks that may facilitate communications between connected address book subsystem 110 and access devices 120.

In some examples, system 100 may include any computing hardware and/or instructions (e.g., software programs), or combinations of computing instructions and hardware, configured to perform the processes described herein. In particular, it should be understood that components of system 100 may be implemented on one physical computing device or may be implemented on more than one physical computing device. Accordingly, system 100 may include any one of a number of computing devices and/or computer operating systems (e.g., mobile device operating systems).

In some examples, the processes described herein may be implemented at least in part as computer-executable instructions, i.e., instructions executable by one or more computing devices, tangibly embodied in a computer-readable medium. In general, a processor (e.g., a microprocessor) receives instructions, e.g., from a memory, a computer-readable medium, etc., and executes and/or directs execution of those instructions, thereby performing one or more processes, including one or more of the processes described herein. Such instructions may be stored and transmitted using a variety of known computer-readable media.

A computer-readable medium (also referred to as a processor-readable medium) includes any medium that participates in providing data (e.g., instructions) that may be read by a computer (e.g., by a processor of a computer). Such a medium may take many forms, including, but not limited to, non-volatile media, volatile media, and transmission media. Non-volatile media may include, for example, optical or magnetic disks and other persistent memory. Volatile media may include, for example, dynamic random access memory ("DRAM"), which typically constitutes a main memory. Transmission media may include, for example, coaxial cables, copper wire and fiber optics, including the wires that comprise a system bus coupled to a processor of a computer. Transmission media may include or convey acoustic waves, light waves, and electromagnetic emissions, such as those generated during radio frequency ("RF") and infrared ("IR") data communications. Common forms of computer-readable media include, for example, a floppy disk, a flexible disk, hard disk, magnetic tape, any other magnetic medium, a CD-ROM, DVD, any other optical medium, punch cards, paper tape, any other physical medium with patterns of holes, a RAM, a PROM, an EPROM, a FLASH-EEPROM, any other memory chip or cartridge, or any other medium from which a computer can read.

Figure 3:
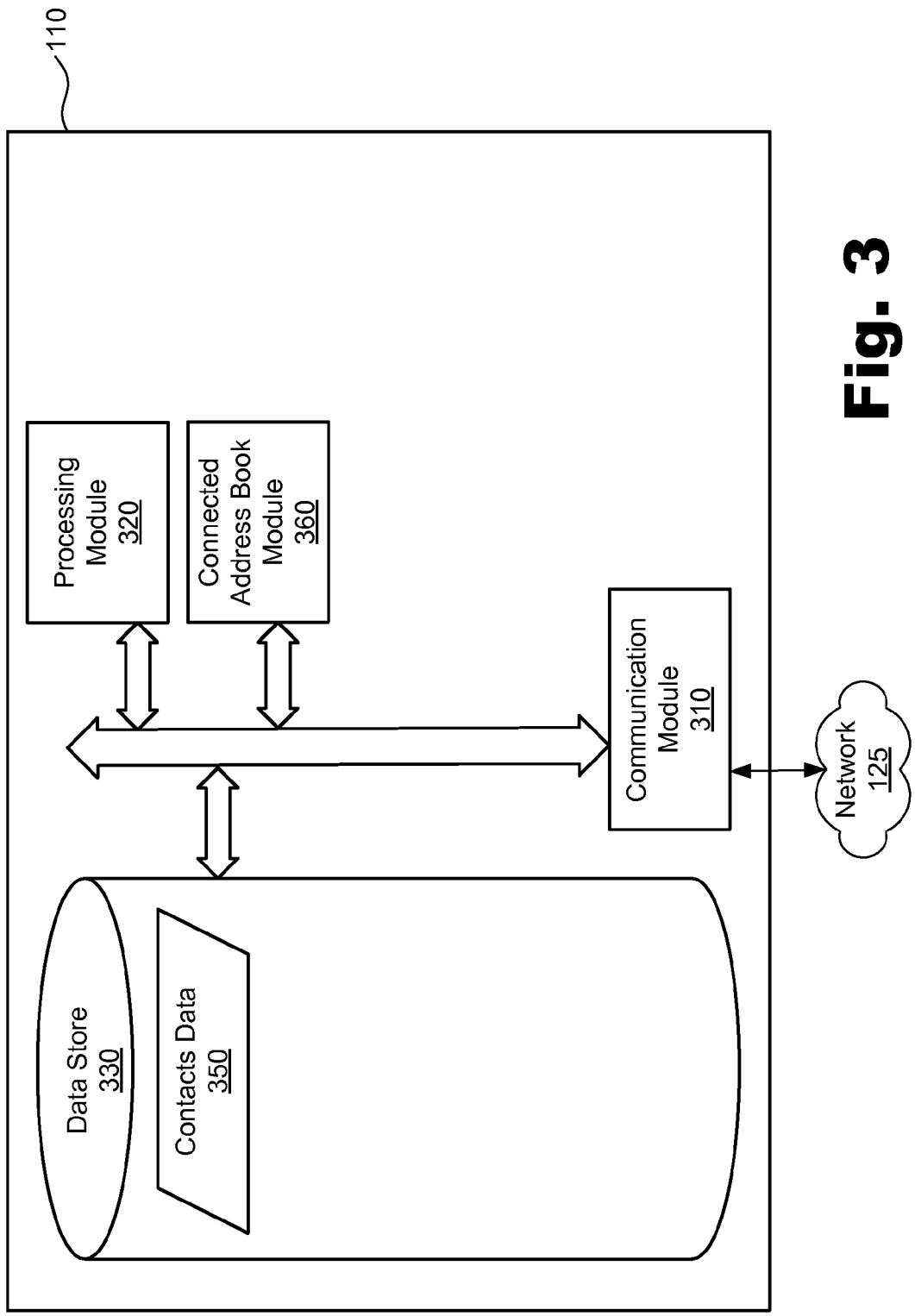
FIG. 3 illustrates an exemplary connected address book subsystem.

FIG. 3 illustrates exemplary components of connected address book subsystem 110. The components of connected address book subsystem 110 may include or be implemented as hardware, computing instructions (e.g., software) embodied on a computer-readable medium, or a combination thereof. In certain embodiments, for example, one or more components of connected address book subsystem 110 may include or be implemented on one or more servers, such as one or more servers included in server subsystem 210, configured to communicate over network 125. While an exemplary connected address book subsystem 110 is shown in FIG. 3, the exemplary components illustrated in FIG. 3 are not intended to be limiting. Indeed, additional or alternative components and/or implementations may be used in other embodiments.

As shown in FIG. 3, connected address book subsystem 110 may include a communication module 310, which may be configured to communicate with access devices 120 over network 125, including transmitting and receiving data to/from access devices 120. The communication module 310 may include and/or support any suitable communication platforms and technologies for communicating with and transporting data to/from access devices 120. Communication module 310 may be configured to support a variety of communication platforms, protocols, and formats such that connected address book subsystem 110 may receive data from and distribute data to a variety of computing platforms (e.g., a mobile telephone service platform, a web-based platform, a subscriber television platform, etc.) using a variety of communications technologies. Accordingly, the connected address book subsystem 110 may be configured to support a multi-platform system in which data and communication signals can be received from and provided to diverse platforms.

Connected address book subsystem 110 may include a processing module 320 configured to control operations of components of the connected address book subsystem 110. Processing module 320 may execute or direct execution of operations in accordance with computer-executable instructions stored to a computer-readable medium such as a data store 330. As an example, processing module 320 may be configured to process (e.g., encode, decode, modulate, and/or demodulate) data and/or communications received from or to be transmitted to access devices 120. As another example, processing module 320 may be configured to perform data management operations on data stored in data store 330. For example, processing module 320 may operate on data, including storing data to data store 330 and indexing, searching, accessing, retrieving, modifying, annotating, backing up, encrypting, encoding, decrypting, decoding, copying, and/or deleting data stored in data store 330. In some examples, processing module 320 may be configured to perform device-specific data formatting before data is provided to (e.g., downloaded by) a particular access device 120.

Data store 330 may include one or more data storage media, devices, or configurations and may employ any type, form, and combination of storage media. For example, the data store 330 may include, but is not limited to, a hard drive, network drive, flash drive, magnetic disc, optical disc, random access memory ("RAM"), dynamic RAM ("DRAM"), other non-volatile and/or volatile storage unit, or a combination or sub-combination thereof. Data store 330 may store any suitable type or form of electronic data, including contacts data 350, for example.

Contacts data 350 may include any electronically stored information associated with one or more users 130, including contact information potentially useful for communicating with the users 130. Examples of such information may include, but are not limited to, information descriptive of physical addresses, network addresses, e-mail addresses, messaging addresses, user identifiers (e.g., user names), phone numbers, facsimile numbers, business identifiers, related contacts (e.g., colleagues, coworkers, friends, etc.), and any other information potentially helpful for communicating with users 130.

Connected address book subsystem 110 may further include a connected address book module 360, which may include or be implemented as hardware, computing instructions (e.g., software) tangibly embodied on a computer-readable medium, or a combination of hardware and computing instructions configured to perform one or more of the processes described herein. In certain embodiments, connected address book module 360 may be implemented at least in part as a software application embodied on a computer-readable medium such as data store 330 and configured to direct processing module 320 to execute one or more of the connected address book operations described herein.

Connected address book module 360 may be configured to maintain and provide remote access to contacts data 350 for one or more connected address books, which may also be referred to as network address books. A connected address book may include contacts data 350 associated with one or more users 130. The contacts data 350 may be organized as one or more connected address book listings (also referred to as "network address book listings" or "address book listings") corresponding to one or more respective users 130. Accordingly, a connected address book may include a plurality of address book listings associated with a plurality of users 130. In certain examples, a plurality of users 130 utilizing access devices 120 may provide contact information to connected address book subsystem 110 over network 125 for use by connected address book module 360. The contact information may be stored as contacts data 350 in data store 330 and used to form a network address book including contacts data 350 for the users 130.

Connected address book module 360 may be configured to provide one or more tools for use by users 130 to manage their respective contacts data 350 stored in data store 330. For example, one of the users 130 (e.g., user 130-1) may upload a new telephone number, and connected address book module 360 may receive the data and update the contacts data 350 to reflect the new telephone number. After the update has been accomplished, the updated contacts data 350 may be made available for access by other users. In this or similar manner, user 130-1 has significant capability to update or otherwise manage contacts data 350 stored in data store 330 that is associated with the user 130-1 and that may be made available to other users 130.

Connected address book module 360 may be configured to respond to one or more requests for contacts data 350 included in a network address book. For example, a user 130-2 may utilize access device 120-2 to send a request to connected address book subsystem 110 over network 125 for contacts data 350 corresponding to user 130-1 (e.g., a request for an address book listing for user 130-1). Connected address book module 360 may process the request, including identifying the requested contacts data 350 in data store 330 and providing access device 120-2 with access to the contacts data 350 (e.g., by initiating transmission of data representative of the contacts data 350 to the access device 120-2). As described further below, in certain embodiments, access to certain contacts data 350 may be selectively provided based on predefined settings.

Connected address book subsystem 110 may be configured to use local address book data stored by one or more access devices 120 to perform one or more of the connected address book operations described herein, including leveraging local address book data to facilitate a user 130 utilizing a network address book and/or related services. As described in more detail further below, a user 130-1 of an access device 120-1 may elect to provide data representative of at least a portion of a local address book maintained on the access device 120-1 to connected address book subsystem 110. In certain embodiments, connected address book subsystem 110 may be configured to receive and use the local address book data to perform one or more connected address book operations, which may include identifying any listings that are common between a local address book and a network address book.

Connected address book module 360 may include a predefined matching heuristic specifying one or more conditions to be used to identify common listings. For example, a match between a local address book listing and a network address book listing may be identified when the listings include identical or substantially similar identifiers (e.g., user names) and/or other contacts data 350. The conditions in the matching heuristic may be defined as may suit a particular implementation. In certain embodiments, for example, connected address book module 360 may be configured to look for defined similarities between people's names associated with listings.

Connected address book subsystem 110 may be configured to provide one or more indications of matched listings common to local and network address books. For example, when a match is found, connected address book subsystem 110 may transmit data representative of an indication of the identified match and/or listing to access device 120-1, which may be configured to process and present the indication to user 130-1. In certain embodiments, the indication may include a visual indicator configured to be displayed in a graphical user interface by access device 120-1. An example of a display of such indications will be described further below. Other examples of connected address book operations will also be described further below.

Access device 120 may include any device configured to perform one or more of the access device operations described herein, including communicating with connected address book subsystem 110 by way of network 125. Access device 120 may include, but is not limited to, a computing device, a communication device (e.g., a telephone), a wireless computing device, a wireless communication device (e.g., a mobile telephone configured to access one or more services provided over network 125), a personal digital assistant, a vehicular computing and/or communication device, a navigation device, a set-top box, a media content processing subsystem, and any other device configured to perform one or more of the access device operations described herein.

Figure 4:
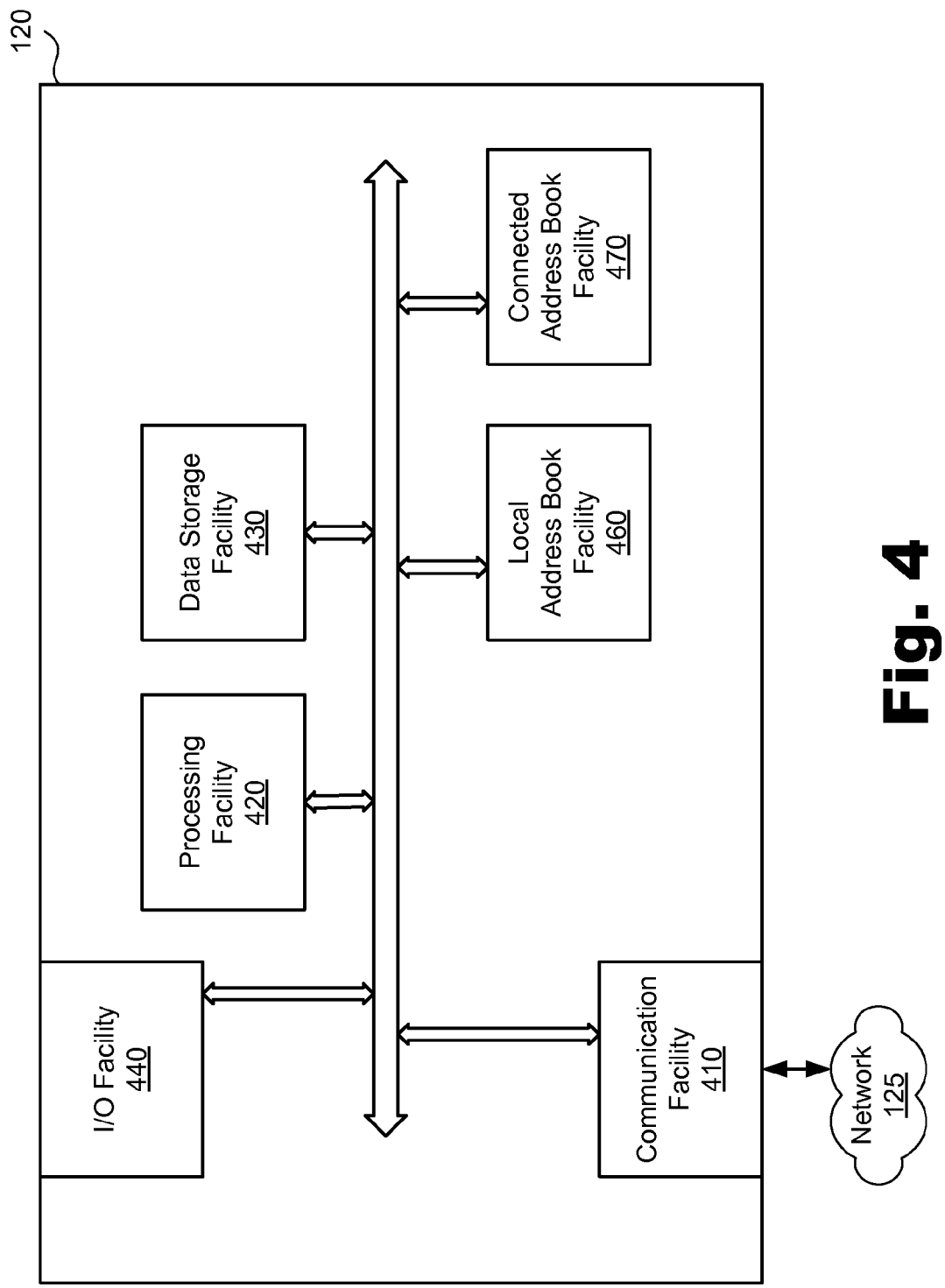
FIG. 4 illustrates components of an exemplary access device.

FIG. 4 illustrates components of an exemplary access device 120. As shown in FIG. 4, access device 120 may include a communication facility 410, processing facility 420, data storage facility 430, input/output ("I/O") facility 440, local address book facility 460, and connected address book facility 470 communicatively connected to one another. The facilities 410-470 may be communicatively connected using any suitable technologies. Each of the facilities 410-470 may be implemented as hardware, computing instructions (e.g., software) tangibly embodied on a computer-readable medium, or a combination of hardware and computing instructions configured to perform one or more of the access device operations described herein.

Communication facility 410 may be configured to send and receive communications over network 125, including sending and receiving data and communications to/from connected address book subsystem 110. Communication facility 410 may include any device, logic, and/or other technologies suitable for transmitting and receiving data and other communications. In certain embodiments, the communication facility 410 may be configured to support other network service communications over network 125, including wireless voice, data, and messaging communications. The communication facility 410 may be configured to interface with any suitable communication media, protocols, formats, platforms, and networks, including any of those mentioned herein.

Processing facility 420 may be configured to control operations of one or more components of the access device 120. Processing facility 420 may execute and/or direct execution of operations in accordance with computer-executable instructions such as may be stored in data storage facility 430 or other computer-readable medium. As an example, processing facility 420 may be configured to process communications, including demodulating, decoding, and parsing received communications, and encoding and modulating communications for transmission to connected address book subsystem 110.

Data storage facility 430 may include one or more data storage media, devices, or configurations and may employ any type, form, and combination of computer-readable media. For example, the data storage facility 430 may include, but is not limited to, a hard drive, network drive, flash drive, magnetic disc, optical disc, random access memory ("RAM"), dynamic RAM ("DRAM"), other non-volatile and/or volatile storage unit, or a combination or sub-combination thereof. Data, including local contacts data for a local address book, may be temporarily and/or permanently stored in the data storage facility 430.

I/O facility 440 may be configured to receive user input and provide user output and may include any hardware, firmware, software, or combination thereof supportive of input and output capabilities. For example, I/O facility 440 may include one or more devices for capturing user input, including, but not limited to, a microphone, keyboard or keypad, touch screen component, scanner, camera, and receiver (e.g., an RF or infrared receiver).

I/O facility 440 may include one or more components for presenting data for experiencing by a user 130, including, but not limited to, a graphics engine, a display, one or more display drivers, one or more audio speakers, and one or more audio drivers. Accordingly, I/O facility 440 may present data and/or other content for experiencing by the user 130.

Local address book facility 460 may include any hardware, computing instructions (e.g., software), or combination thereof configured to perform one or more of the local address book operations described herein. In certain embodiments, local address book facility 460 includes computing instructions (e.g., a software application) configured to direct access device 120 (e.g., direct processing facility 420 of the access device 120) to perform one or more of the local address book operations described herein. In some examples, a user 130 of access device 120 may selectively launch or terminate local address book facility 460 to respectively enable or disable one or more local address book operations.

Local address book facility 460 may be configured to maintain a local address book including locally stored contacts data organized as one or more local listings associated with one or more people. A local address book listing may include any information potentially useful for communicating with, or otherwise associated with, one or more people, including, but not limited to, a contact identifier (e.g., a person's name), address information, telephone numbers, e-mail address, employment information (e.g., a job title), personal information (e.g., names of family members, important dates, and marital status), etc.

Local address book facility 460 may be further configured to provide an interface (e.g., a graphical user interface) and/or views or content for inclusion in an interface that may be utilized by a user 130 to manage locally stored contacts data and listings. Through the interface, the user 130 may access, update, and otherwise manage local address book data, including adding, deleting, and modifying locally stored listings.

Connected address book facility 470 may include any hardware, computing instructions (e.g., software), or combination thereof configured to perform one or more of the connected address book operations described herein. In certain embodiments, connected address book facility 470 includes computing instructions (e.g., a software application) configured to direct access device 120 (e.g., direct processing facility 420 of the access device 120) to perform one or more of the connected address book operations described herein. In some examples, a user 130 of access device 120 may selectively launch or terminate connected address book facility 470 to respectively enable or disable connected address book operations and/or services.

In FIG. 4, local address book facility 460 and connected address book facility 470 are shown as separate components, which may be configured to interface with one another. In certain examples, connected address book facility 470 may be configured to interface with local address book facility 460 such as through an application program interface. In certain alternative implementations, local address book facility 460 and connected address book facility 470 may be combined such as by being implemented as a single software or firmware application. In yet other alternative implementations, connected address book facility 470 may be omitted from access device 120, and connected address book subsystem 110 may be configured to perform one or more of the connected address book operations that would have otherwise been performed by connected address book facility 470, including interfacing with local address book facility 460. Such implementations may help conserve resources of access device 120.

Connected address book facility 470 may be configured to initiate, respond to, and/or otherwise control interactions with connected address book subsystem 110. For example, connected address book facility 470 may be configured to provide local address book data to connected address book subsystem 110. As another example, connected address book facility 470 may be configured to generate and send requests for access to contacts data 350 to connected address book subsystem 110 over network 125. Connected address book facility 470 may be further configured to process responses to the requests, including integrating contacts data 350 and/or other data or objects received from connected address book subsystem 110 into a local address book and/or user interface.

Accordingly, connected address book facility 470 may be configured to interface with local address book facility 460, including integrating contacts data 350 and/or other data or objects received from connected address book subsystem 110 into processes performed by local address book facility 460. As an example, connected address book facility 470 may receive data representative of a network address book listing from connected address book subsystem 110 and provide the listing to local address book facility 460 for inclusion in a local address book and/or user interface. For instance, connected address book facility 470 may interface with local address book facility 460 to provide an indication of a listing common to a local address book and a network address book for display in a local address book view included in a graphical user interface, an example of which will be described further below.

In certain embodiments, connected address book facility 470 may be configured to convert a local listing included in a local address book maintained on an access device 120 to a connected address book listing associated with a network address book. In some examples, the conversion may include removing the local listing from the local address book and inserting the connected address book listing or other object that is associated with contacts data 350 for the connected address book listing maintained by connected address book subsystem 110. In this or similar manner, connected address book facility 470 may be configured to provide a hybrid address book including at least one local address book listing associated with a local address book maintained on an access device 120 and at least one network address book listing associated with a network address book maintained on connected address book subsystem 110. Such a hybrid address book including locally and remotely stored contacts data may provide a user 130 with significant capabilities for managing address book listings and the contacts data included therein.

Connected address book facility 470 may be configured to provide a user 130 with a variety of tools for managing network address book data, local address book data, or a combination of network and local address book data. To help facilitate an understanding of connected address book system 100, exemplary connected address book operations, and tools that may be provided to users 130 for managing a connected address book, FIGS. 5A-5E illustrate a graphical user interface having exemplary address book views displayed therein.

Figure 5A:
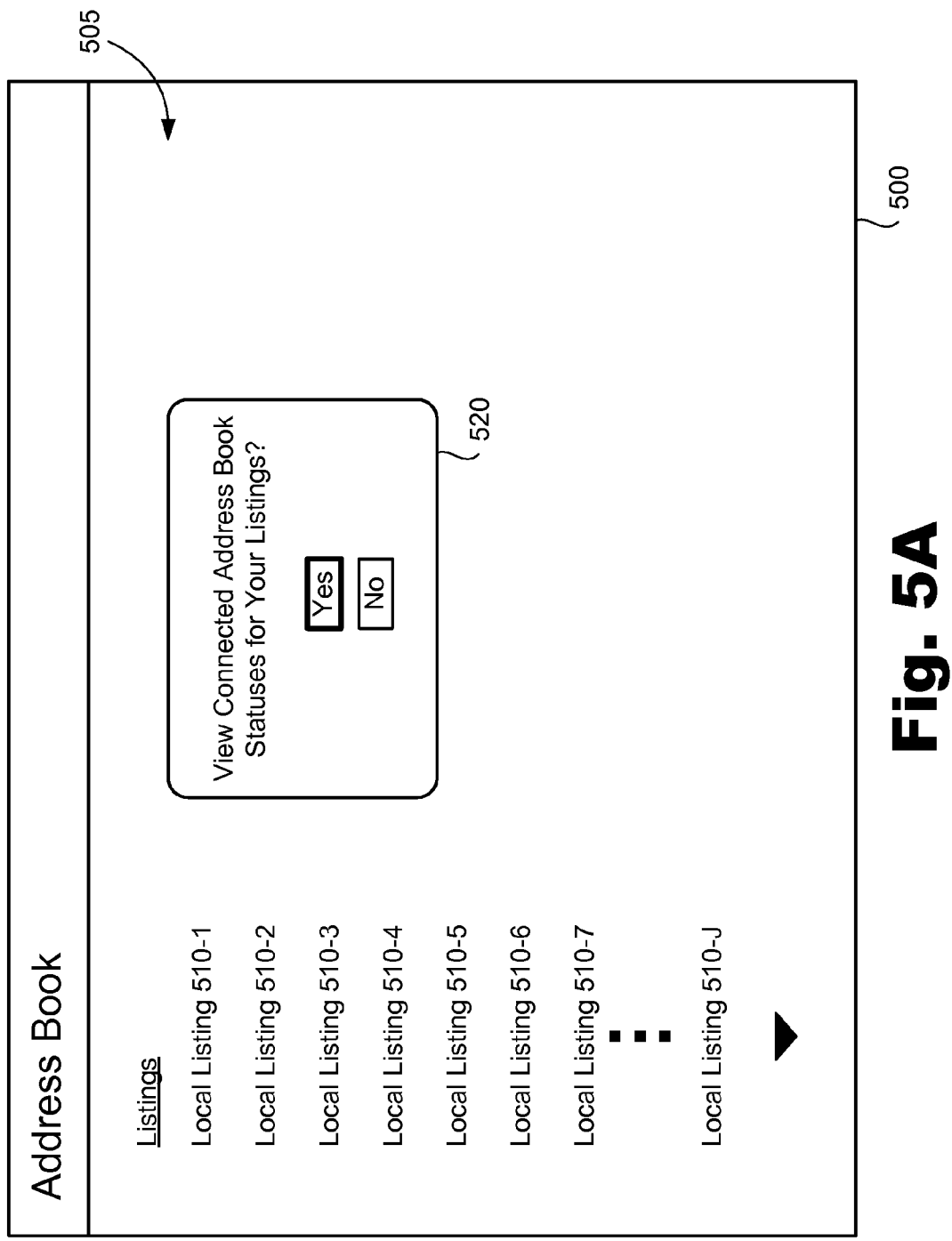

FIG. 5A illustrates a graphical user interface ("GUI") 500 including a local address book view 505 displayed therein. As shown, local address book view 505 may include a plurality of local address book listings 510-1 through 510-J (collectively "listings 510"). In local address book view 505, local listings 510 may be represented by one or more graphical objects associated with locally stored contacts data. For example, a name of a person, an image of the person, or other identifier may be displayed in GUI 500 to represent a local listing 510 for the person.

GUI 500 may provide a tool configured to facilitate a user selection to preview connected address book statuses for local address book listings 510. As shown in FIG. 5A, for example, local address book view 505 may include an options window 520 configured to allow user 130 to select whether to view connected address book statuses for local listings 510. When user 130 selects "Yes," connected address book facility 470 may communicate with connected address book subsystem 110 and local address book facility 460 to generate and provide a view of connected address book statuses for one or more of the local listings 510 in GUI 500. For example, connected address book facility 470 may communicate with local address book facility 460 to request locally stored contacts data associated with local listings 510. Connected address book facility 470 may receive and provide the local contacts data to connected address book subsystem 110 over network 125. Connected address book subsystem 110 may use the local contacts data, i.e., data representative of at least a portion of a local address book, to perform at least one connected address book operation as described above, including identifying one or more local listings 510 in the local address book data that are also included in a network address book. Connected address book subsystem 110 may provide indications of matched listings to connected address book facility 470, which may interface with local address book facility 460 to integrate the indications into local address book view 505.

In certain embodiments, a connection address book status may indicate whether a particular listing 510 is included in a network address book. Such a connection address book status may allow a user 130 to determine which if any of the local listings 510 included in a local address book are represented in a network address book. In some cases, this may provide user 130 with an incentive or convenient way to join or otherwise participate in a connected address book service.

FIG. 5B illustrates the local address book view 505 of FIG. 5A with indications of connected address book statuses 530 for several local listings 510 displayed therein. In the illustrated example, local listings 510-1, 510-2, 510-4, and 510-7 are indicated as having matching listings in a network address book maintained at connected address book subsystem 110, and local listings 510-3, 510-5, 510-6, and 510-J are indicated as not having matching listings in the network address book. The indications shown in FIG. 5B are illustrative only. Other indications of connection statuses may be used in other embodiments, including any suitable graphical objects or other visual indicators of connection statuses.

Connected address book facility 470 may be configured to provide at least one tool configured to facilitate a user selection indicating how listings are to be controlled or maintained. For example, connected address book facility 470 may provide user 130 with an option for selecting whether one or more of the local listings 510 will remain under manual control of the user 130 or whether control of one or more of the local listings will be relinquished. When user 130 selects to relinquish control of a listing 510, one or more connected address book operations may be performed to transfer control of the listing 510 from a local address book to a connected address book. For example, control of the listing 510 may be transferred from local address book facility 460 to connected address book facility 470, connected address book subsystem 110, a user of whom the listing 510 is descriptive, or a combination or sub-combination thereof.

Figure 5C:
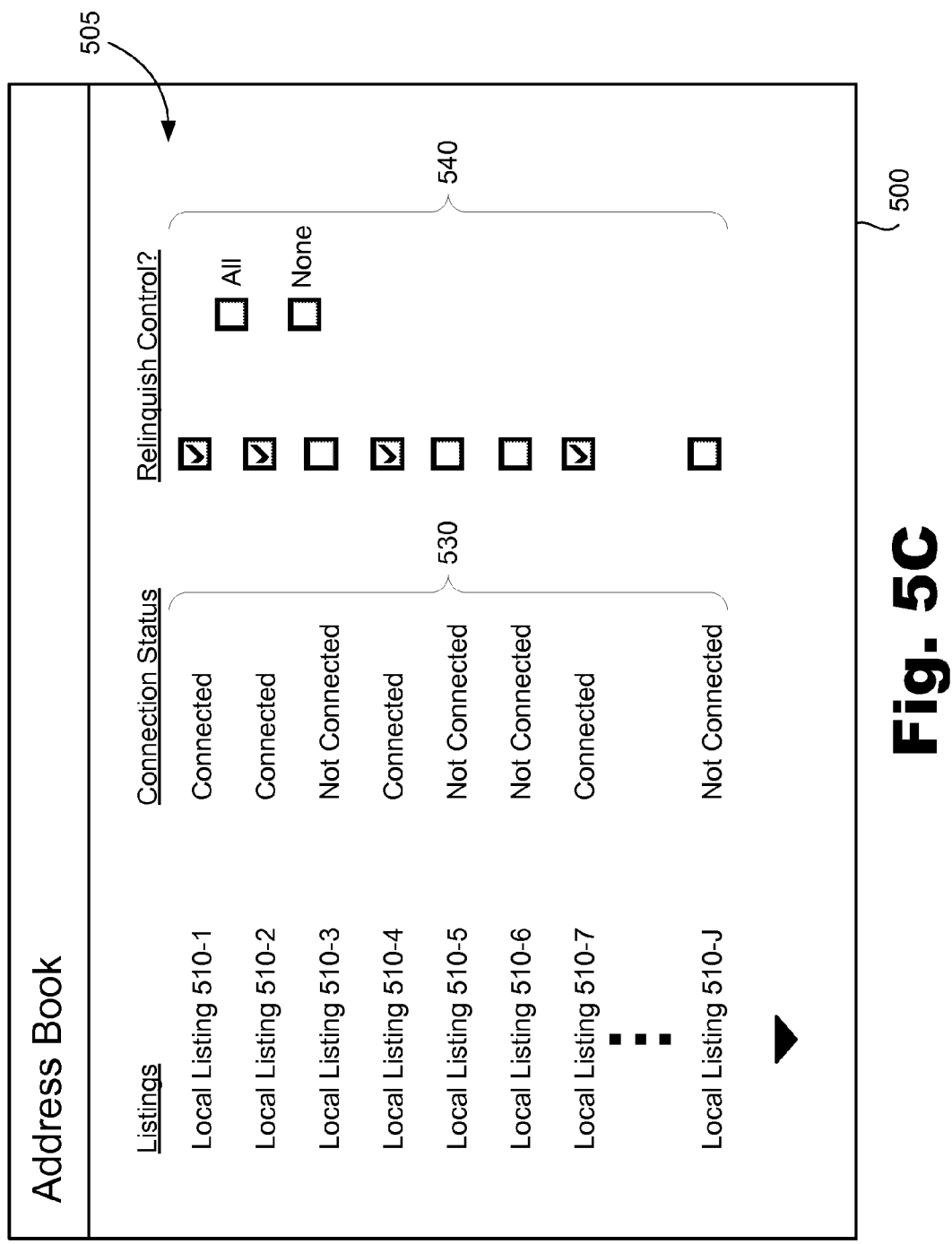

FIG. 5C illustrates an example of connected address book facility 470 providing an option for user 130 to select to relinquish control of one or more local listings 510. As shown, GUI 500 may include one or more selection mechanisms 540, which may be in the form of check boxes, for use by user 130 to select whether to relinquish control of local listings 510. The check boxes illustrated in FIG. 5C are illustrative only. Other selection mechanisms 540 may be provided in other embodiments.

In the illustrated example, a check box is provided for each local listing 510 such that user 130 may select a control mode for each local listing 510 independently of other local listings 510. Accordingly, user 130 may select to maintain local control of one listing (e.g., listing 510-3) and to relinquish control of another listing (e.g., listing 510-2). As shown in FIG. 5C, connected address book facility 470 may also provide check boxes for selecting all or none of the local listings 510.

In certain embodiments, connected address book facility 470 may be configured to automatically populate one or more of the check boxes based on the connection statuses 530 of local listings 510. In certain embodiments, for example, each check box associated with a local listing 510 having a "connected" status is populated with a check signifying a proposed selection to relinquish control of the local listing 510.

When user 130 selects to relinquish control of a listing 510, transfer of control may be accomplished in any suitable manner. In certain embodiments, for example, connected address book facility 470 may detect the selection and interface with local address book facility 460 to convert the local listing 510 to a connected address book listing associated with contacts data 350 remotely stored in data store 330. For example, local listing 510 may be replaced by a shell listing having a pointer to a network address book listing and/or a call to connected address book facility 470. As another example, local listing 510 may be modified such that it is associated with remotely stored contacts data 350 rather than with locally stored contacts data. In certain embodiments, local contacts data associated with the local listing 510 may be archived or deleted such that the modified local listing 510 is maintained as a shell locally and the contacts data 350 associated with and used for the local listing 510 is stored at connected address book subsystem 110 for access by access device 120. Such an implementation may help conserve storage resources of access device 120.

In other embodiments, the conversion of a local listing 510 may include providing a copy of contacts data 350 stored at connected address book subsystem 110 to access device 120 for local storage and association with the local listing 510. In such embodiments, connected address book facility 470 may be configured to automatically synchronize the locally stored data with the contacts data 350 stored in data store 330. Synchronization may be performed periodically and/or in response to a predetermined event, including an event such as when a change is made to contacts data 350 in data store or when a request to access the listing 510 is received.

By converting one or more local listings 510 to network listings, connected address book facility 470 may be configured to convert a local address book to a hybrid address book having at least one local address book listing and at least one network address book listing. A local listing may be manually controlled by a user 130 and/or local address book facility 460, and a network listing may be controlled by connected address book facility 470 and/or connected address book subsystem 110. This may provide user 130 significant flexibility and usability in managing an electronic address book, especially when user 130 desires to have both local and network controls or listings for the address book.

FIG. 5D illustrates GUI 500 having a hybrid address book view 550 included therein. As shown, a hybrid address book may include local listings 510-4, 510-5, 510-6, and 510-J, and connected address book listings 560-1, 560-2, 560-3, and 510-4. As described above, connected address book listings may be associated with contacts data 350 stored remotely at connected address book subsystem 110. The hybrid address book illustrated in FIG. 5D may be generated in response to a user selecting to relinquish control of the selected local listings 510-1, 510-2, 510-4 and 510-7 shown in FIG. 5C.

In certain embodiments, connected address book facility 470 may be configured to provide data field level control options to a user 130. For example, connected address book facility 470 may allow user 130 to select different control modes for different data fields within a listing. Accordingly, a control mode for a data field may be selected independently of other data fields in a listing. For instance, user 130 may select to maintain manual control of one data field (e.g., a person's name) in a listing and to relinquish control of another data field (e.g., a person's telephone number) in the listing. Such a listing may be referred to as a hybrid listing having locally and remotely controlled data fields.

Figure 5E:
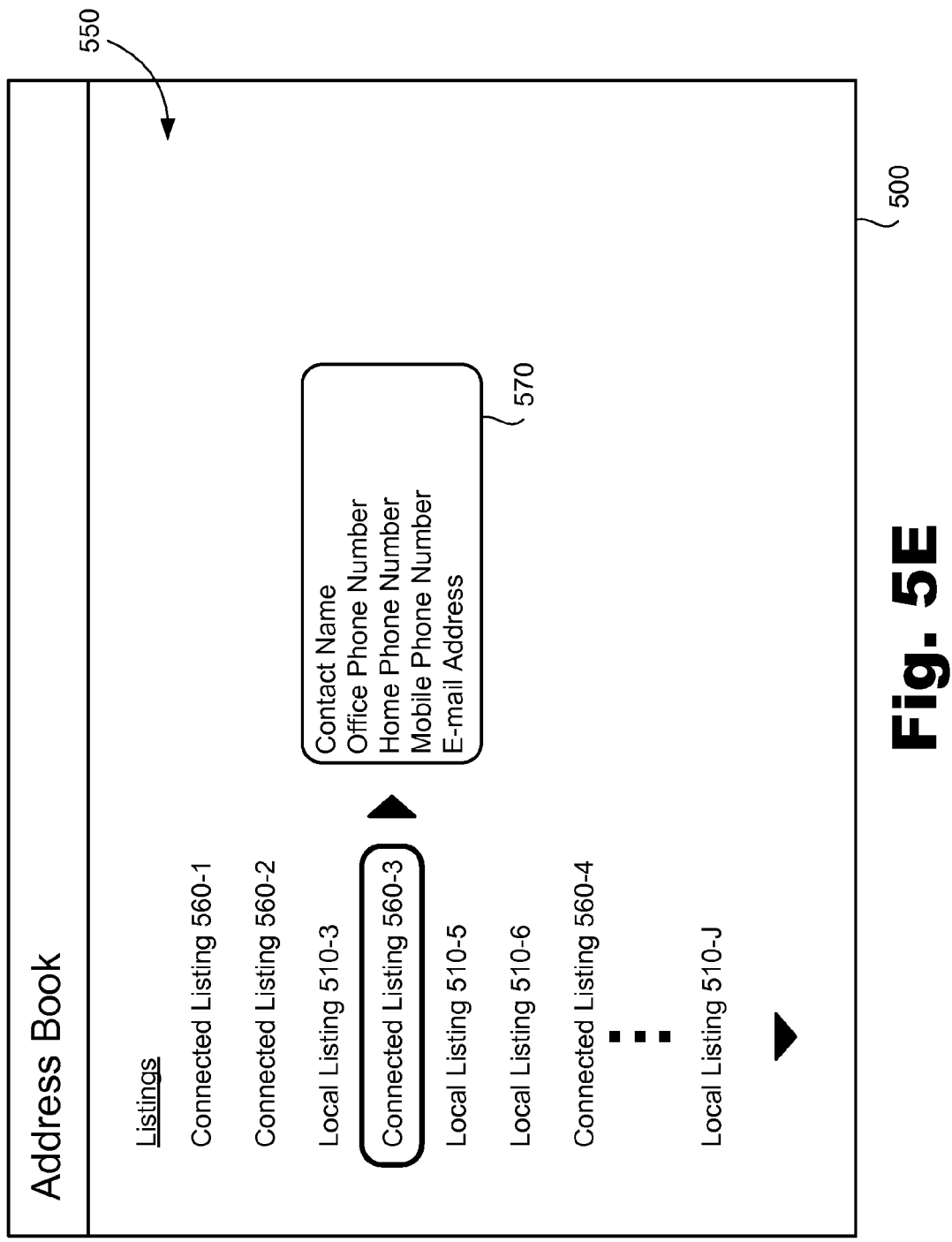

When a user 130 searches for and/or selects a listing included in an address book, contacts data associated with the listing may be accessed and displayed in GUI 500. FIG. 5E illustrates an exemplary contact information window 570 displayed in hybrid address book view 550 in GUI 500. As shown, the contact information window 550 may include contacts data associated a selected listing 560-3, including a contact name, phone numbers, and e-mail address.

When the selected listing is a local listing 510 associated with locally stored contacts data, the data may be locally retrieved and presented by local address book facility 460. For instance, local contacts data may be retrieved from data storage facility 430. When the selected listing is a network listing 560 associated with remotely stored contacts data (e.g., contacts data 350), the data may be retrieved from a remote source such as connected address book subsystem 110 and presented by connected address book facility 470. For instance, connected address book facility 470 may generate and send a request for the data to connected address book subsystem 110, which may identify and provide the requested data. When the selected listing is associated with both locally and remotely stored contacts data, the data may be retrieved from the appropriate source and combined for presentation in contact information window 570.

In certain embodiments, the scope of a search for contacts data may be incrementally expanded. For example, when a user 130 initiates a search for contacts data, a search of local resources such as data storage facility 430 may be performed. If the requested data is not found locally, a request for the contacts data may be sent to a remote source such as connected address book subsystem 110, which may search for the requested data. If the requested data is still not found, the search may be expanded to other potential sources, including social networking sites and/or directory services sites, for example.

The contacts data shown in contact information window 570 in FIG. 5E is illustrative only. Any suitable contacts data or other data associated with the user 130 corresponding with listing 560-3 may be presented in GUI 500. Examples of such data may include, but are not limited to, social networking site information and/or status (e.g., a social networking webpage associated with a user 130), media content associated with a user 130 (e.g., media content provided by the user 130), a ringtone and/or ringbacktone associated with a user 130 or access device 120, recommendations from other users 130, descriptions of actions performed by other users 130 (e.g., a record of a purchase made by a user 130), information about other users connected to listing 560-3, and user profile data associated with a user.

Connected address book subsystem 110 may be configured to selectively distribute contacts data 350 and/or other data or content to one or more access devices 120 and/or users 130. In certain embodiments, the selective distribution of contacts data 350 associated with a user 130 may be controlled by the user 130. For example, the user 130 may define one or more personas specifying instances (e.g., select subsets) of contacts data 350 or other data or content that may be made available to certain users. In some examples, the user 130 may be provided with one or more tools configured to facilitate the user defining a user profile, user profile settings, user groups, and/or personas that may be used for selectively distribution of contacts data 350 to other users of a network address book.

Figure 6:
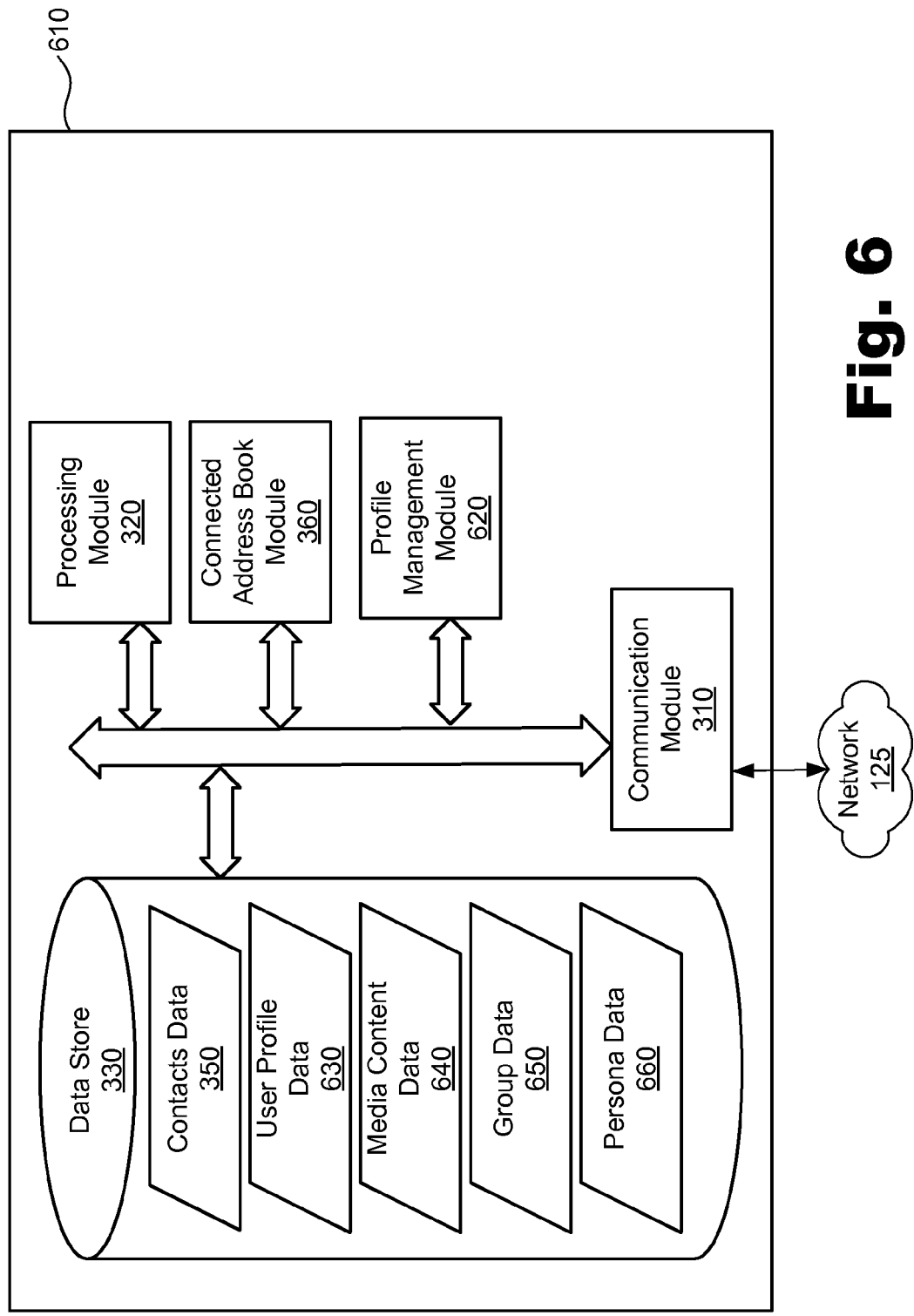
FIG. 6 illustrates another exemplary connected address book subsystem.

FIG. 6 illustrates components of another exemplary connected address book subsystem 610. As illustrated, in addition to the components of connected address book subsystem 110 shown in FIG. 3, connected address book subsystem 610 may include a profile management module 620, which may include or be implemented as hardware, computing instructions (e.g., software) tangibly embodied on a computer-readable medium, or a combination of hardware and computing instructions configured to perform one or more of the profile management processes described herein. In certain embodiments, profile management module 620 may be implemented as a software application embodied on a computer-readable medium such as data store 330 and configured to direct processing module 320 to execute one or more of the profile management processes described herein.

Profile management module 620 may be configured to manage one or more user profiles and/or maintain a database of user profiles, media content, and/or permissions settings associated with users 130. Such data, including user profile data 630 and media content data 640 may be stored in data store 330 as shown in FIG. 6.

User profile data 630 may include any information descriptive of one or more users 130 who are associated with access devices 120 and/or who receive one or more services provided over network 125. User profile data 630 may be organized as one or more user profiles associated with one or more respective users 130. A user profile may include user authentication information, user identifiers, information about one or more access devices 120 that correspond with a user 130, user preferences, permissions settings, one or more personas associated with a user 130, and any other information related to a user 130.

Media content data 640 may include or be stored within one or more content instances and metadata associated with the content instances. As used herein, the term "content instance" refers generally to any data record or object (e.g., an electronic file) storing or otherwise associated with content, which may include electronic data representative of text, one or more messages (e.g., short message service ("SMS") messages, electronic mail messages, or multimedia message service ("MMS") messages), one or more symbols, one or more graphics, one or more images (e.g., digital photographs and video frames), email contacts, video, audio, multimedia, video games, or any segment, component, or combination of these or other forms of electronic data that may be viewed or otherwise experienced by a user. Media content data 640 may be received from one or more users 130, associated with user profiles corresponding with the users 130, and stored in data store 330.

In some examples, contacts data 350 may be maintained independently of user profile data 340. In other examples, contacts data 350 may include at least a subset of user profile data 630 that has been designated as contacts data 350 for use by connected address book module 360. For example, user profile data 630 may include a user profile having an e-mail address that is designated as contact information and as such is made accessible for use by connected address book module 360 and/or. Media content data 640 associated with user profile data 630 may be similarly designated as contacts data 350.

In certain embodiments, user profile data 630 may include group data 650 and/or persona data 660. Group data 650 may include any information that can be used to identify groupings of users 130 and/or access devices 120. For example, group data 650 may include information indicating that certain users 130 are members of a group. Group data 650 may be used to selectively provide users 130 in a group with access to user profile data 630, media content data 640, and/or contacts data 350.

Group data 650 may be defined in any suitable manner, including users 130 (e.g., subscription account owners) utilizing access devices 120 to define and provide data representative of the defined groups to connected address book subsystem 110. In certain embodiments, at least certain groups are defined based on user subscription accounts for services provided over network 125. For example, a default group may be defined by connected address book subsystem 110 to include any users associated with a subscription account (e.g., a network data storage and/or connected address book service account). Examples of group data 650 being defined will be described further below.

Persona data 660 may include information defining one or more "personas" associated with one or more users 130. A "persona" may represent a certain set of characteristics, attributes, and/or preferences corresponding to a user 130 or user profile. For example, a user may desire to have a "work" persona, a "family" persona, a "friends" persona, a "dating" persona, etc. In certain embodiments, a user 130 may allow other users or groups of users to only have access to user profile data 630, media content data 640, contacts data 350, and/or a select subset thereof associated with a certain persona. In this manner, a user 130 may have a single user profile associated with connected address book subsystem 110 and may define and utilize multiple personas to represent himself or herself to other users of connected address book subsystem 110 in different ways. For example, a user 130 may define personas such that at least a select subset of contacts data 350 associated with the user's 130 user profile will be available through a first user persona (e.g., a "family" persona) but will not be available through another user persona (e.g., a "work" persona). For instance, a personal e-mail address for the user 130 may be made available to other users associated with the user's 130 "family" persona but not to other users associated with the user's 130 "work" persona.

In certain embodiments, each persona may be defined to specify a select set (e.g., subset) of contacts data 350 associated with a user 130 or the user's user profile. Accordingly, a user profile may include a plurality of personas specifying a plurality of different sets of contacts data 350. Each persona may be further defined to specify one or more other users to whom the persona will be made available. Accordingly, when contacts data 350 for a user 130-1 is requested by another user 130-2, connected address book module 360 may match the requesting user 130-2 to a particular persona associated with user 130-1, based on the definition of the persona, and provide, in response to the request, a select set of contacts data 350 specified by the persona to the requesting user 130-2. Examples of personas, definition of personas, and selective distribution of contacts data 350 based at least in part on personas will be described further below.

Figure 7A:
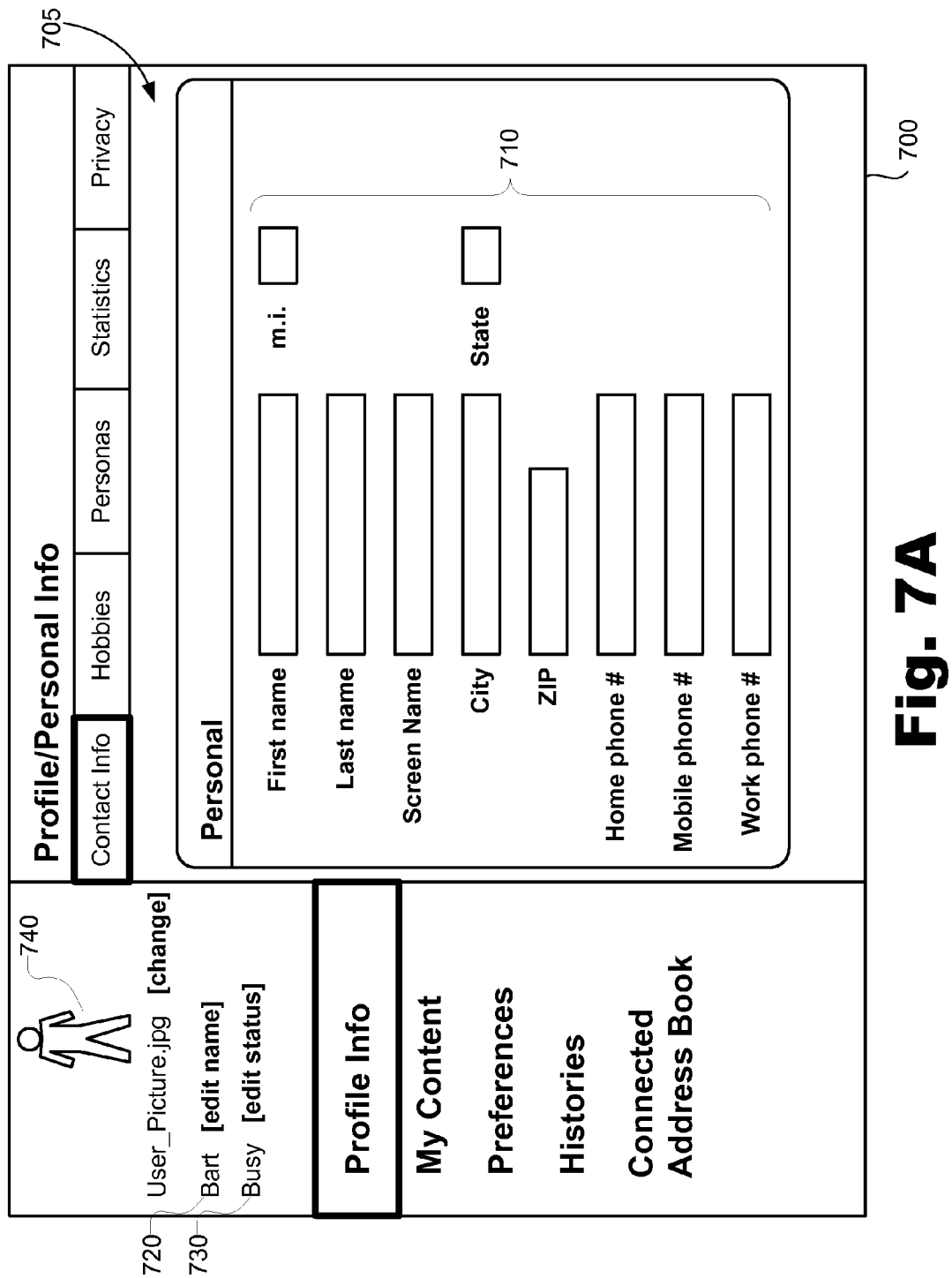
Figure 7B:
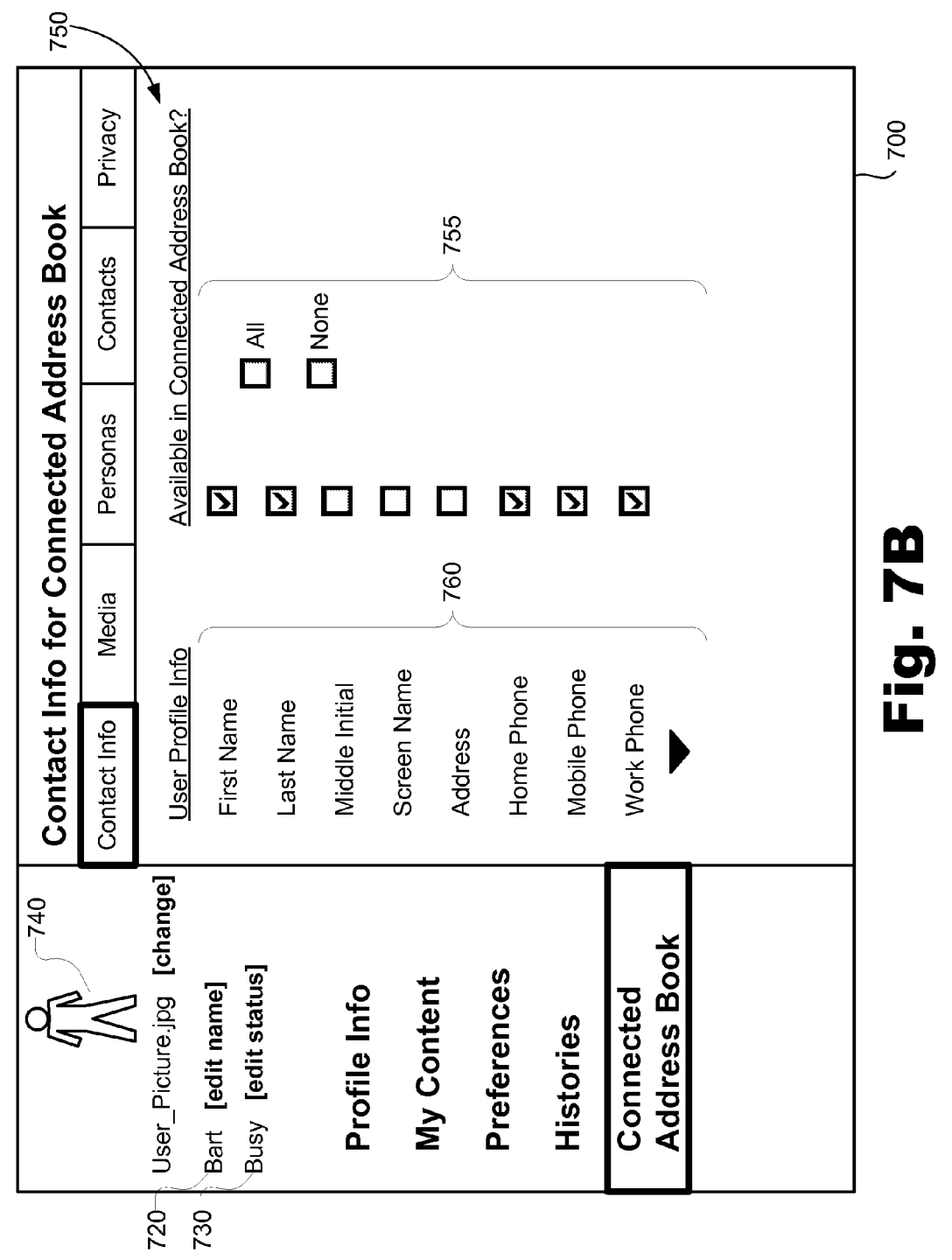
Figure 7C:
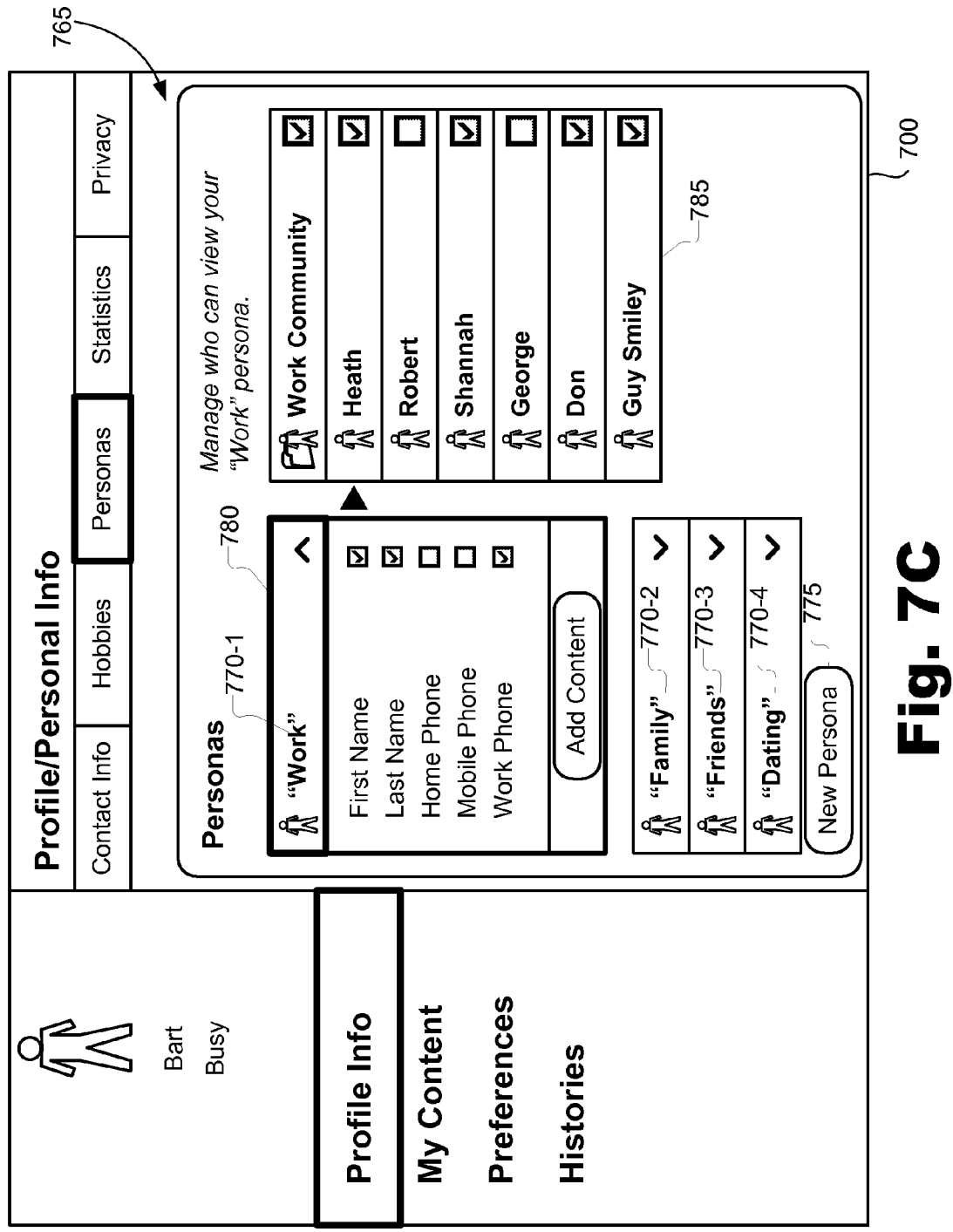

To help facilitate an understanding of user profiles and selective distribution of data based on user profiles (e.g., personas), including selective distribution of select sets of contacts data 350 to access devices 120 by connected address book subsystem 110, FIGS. 7A-7C illustrate an exemplary GUI 700 that may be accessed and displayed by an access device 120 to facilitate management of a user profile. As shown in FIGS. 7A-7C, GUI 700 may include a combination of graphics, text, input fields, and/or other information configured to facilitate creation, editing, and/or managing of one or more user profiles. To illustrate, FIG. 7A shows an information input view 705 having a number of input fields 710 that may be displayed and configured to facilitate entry of personal data associated with a particular user profile. Other customizable attributes associated with a user profile may include, but are not limited to, a user name 720, a user status 730, a user picture 740, and/or any other attribute as may serve a particular application.

In some examples, GUI 700 may include one or more tools configured to facilitate providing of media content to connected address book subsystem 610 by a user 130. The media content may include one or more content instances described above (e.g., an audio or image file) and may be received and defined by connected address book subsystem 610 as being associated with the user's 130 user profile.

In certain embodiments, GUI 700 may include one or more tools configured to facilitate user designation of contacts data 350. For example, GUI 700 may provide a user 130 with an option to select one or more specific fields or instances of user profile data 630 associated with a user 130 and thereby designate at least a subset of user profile data 350 associated with the user 130 as contacts data 350 for use by connected address book module 360. FIG. 7B illustrates a designation view 750 in GUI 700 and having a number of input mechanisms 755, which may be in the form of check boxes, configured to facilitate user designation of one or more user profile data fields or instances 760 as being available for use by connected address book module 360. As an example, a user 130 may select and thereby designate a user's name (e.g., first name and last name in the illustrated example) and telephone numbers included in the user's 130 user profile as being available for use in a connected address book. In this or similar manner, a user 130 may be provided with control over which instances of fields of user profile data 630 will be accessible to other users of the connected address book. The input mechanisms 755 shown in FIG. 7B are illustrative only. Other tools configured to facilitate user designation of one or more instances of user profile data 630 as being available for use in a connected address book may be employed in other embodiments.

Profile management module 620 may be configured to provide a user 130 with one or more tools for defining user profile settings, which may include one or more personas within a user profile, such as a "work" persona, a "family" persona, a "friends" persona, a "dating" persona, etc. The tool(s) may allow a user 130 to select one or more other users of a connected address book, or group(s) of other users of the connected address book, that will be granted access to a select set of contacts data 350 associated with a persona. Accordingly, a persona may be defined to specify an association between a select set of contacts data 350 and one or more users or groups of users having access to the persona.

FIG. 7C shows GUI 700 including at least one tool configured to facilitate definition and management of one or more personas within a user profile. As shown in FIG. 7C, GUI 700 may include persona management view 765 having a listing of personas 770-1 through 770-4 (collectively referred to herein as "personas 770") associated with a user profile corresponding to a user 130. The listing of personas 770 shown in FIG. 7C is merely illustrative of the many different personas that may be defined and associated with a user profile. It will be recognized that a user may add, edit, and/or remove a persona from a user profile as desired. For example, to add a new persona to a user profile, the user may select a "new persona" button 775.

In some examples, GUI 700 may be configured to facilitate association of select contacts data fields or instances with a particular persona 770-1. In certain embodiments, contacts data fields or instances designated as being available in a content address book as described above with reference to FIG. 7B may be used to automatically populate a persona definition window 780 in GUI 700. The data fields or instances may be individually selected or deselected by a user 130 to specify one or more contacts data fields or instances (i.e., a set of contacts data 350) that will be associated with a particular persona 770-1. For instance, a user 130 may select or deselect check boxes to designate particular contacts data fields or instances that will be available through a persona 770-1. In FIG. 7C, a "first name," "last name," and "work phone" data fields are indicated as being associated with "work" persona 770-1. "Home phone" and "mobile phone" data fields are indicated as not associated with, i.e., unavailable through, the "work" persona 770-1. Accordingly, in a connected address book, the selected data fields or instances may be made available to users associated with the "work" persona while the non-selected data fields or instances are not made available to users associated with the "work" persona. It will be recognized that fields and/or instances of contacts data 350 may be associated with more than one persona as may serve a particular application.

While the example of personas described above is directed to a user 130 associating contacts data 350 with personas, this is illustrative only. In other examples, profile management module 620 may provide one or more tools configured to facilitate a user 130 associating other data, including media content data 640 associated with the user 130, with personas for selective distribution to one or more other users based on the personas. For example, a user 130 may specify that a particular media content instance (e.g., a photo) is available through a "friends" persona 770-3 but not through a "work" persona 770-1.

GUI 700 may also be configured to allow a user 130 to selectively associated user profiles to one or more personas 770. For example, as shown in FIG. 7C, a list of user profiles 785 corresponding to other users of connected address book subsystem 610 may be displayed within GUI 700. The list of other user profiles 785 may include the user profiles of one or more individuals, groups, and/or other organizations.

In some examples, a user 130 may be able to associate one or more of the user profiles 785 with one or more personas 770 within with the user's 130 user profile. For example, the user 130 may designate that a user profile be associated with a first user persona (e.g., a "family" persona) but not with another user persona (e.g., a "work" persona). Permissions settings may be defined based on the user's designation and may be used to selectively distribute contacts data 350 based on personas 770 and the associations between personas 770 and user profiles 785.

To illustrate, FIG. 7C shows that a number of user profiles (e.g., "work community," "Heath," "Shannah," "Don," and "Guy Smiley") are associated with "work" persona 770-1. Hence, the users corresponding to these designated user profiles may be provided with access to a set of contacts data 350 and/or other data or content that has been associated with the "work" persona 770-1 as described above.

As an example, user 130-2 may provide a request to access contacts data 350 associated with user 130-1 and stored in data store 330 for use with a connected address book. The connected address book subsystem 610 may match the user 130-2 to a persona based on the definition of personas associated with user 130-1 and identify and provide, based at least in part on the definitions of the user's 130-1 personas, a select set of contacts data 350 in response to the request. Hence, if the requesting user 130-2 is by definition matched to user's 130-1 "work" persona 770-1, the contacts data fields or instances associated with the "work" persona 770-1 may be provided to user 130-2 in response to the request. If the requesting user 130-2 is associated with more than one of user's 130-1 personas, one of the personas may be identified for use in responding to the request based at least in part on a predefined prioritization of personas. In some examples, the predefined prioritization of personas may be defined in advance by user 130-1.

Figure 8:
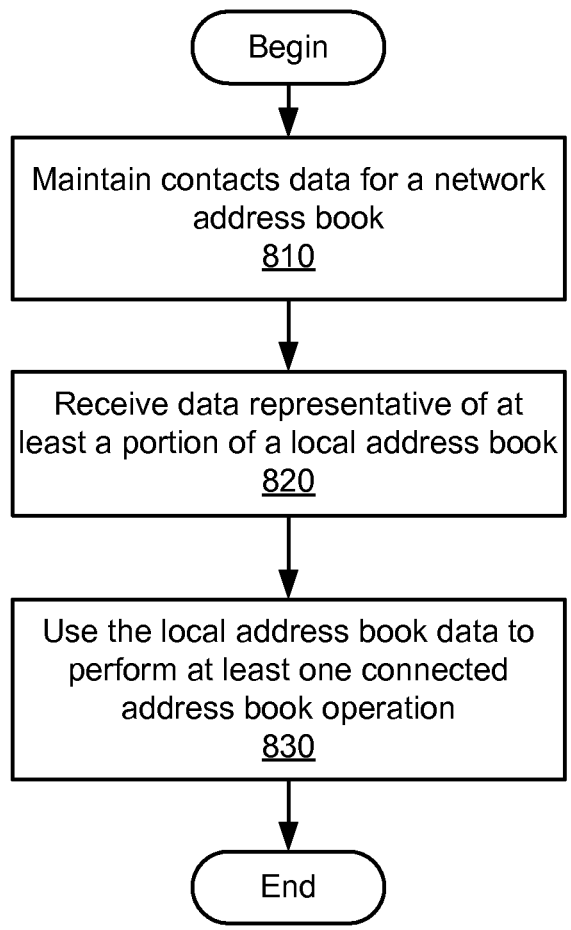
FIG. 8 illustrates an exemplary connected address book method.

FIG. 8 illustrates an exemplary connected address book method. While FIG. 8 illustrates exemplary steps according to one embodiment, other embodiments may omit, add to, reorder, and/or modify any of the steps shown in FIG. 8.

In step 810, contacts data for a network address book is maintained. Step 810 may be performed in any of the ways described above, including connected address book module 360 maintaining the contacts data in data store 330 of connected address book subsystem 110 or 610.

In step 820, data representative of at least a portion of a local address book is received. Step 820 may be performed in any of the ways described above, including connected address book subsystem 110 or 610 receiving the local address book data from an access device 120 over network 125.

In step 830, the local address book data is used to perform at least one connected address book operation, which may include one or more of the connected address book operations described herein. In certain embodiments, for example, at least one listing common to the local address book and the network address book may be identified and an indication of the common listed provided to the access device.

Figure 9:
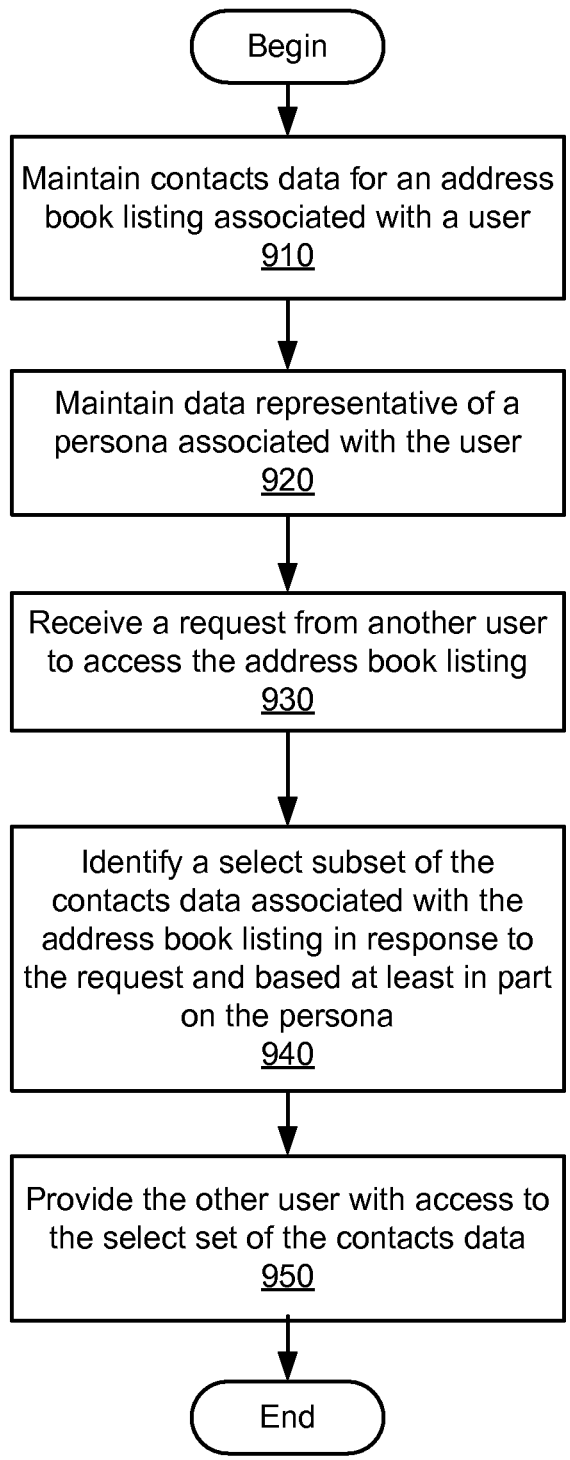
FIG. 9 illustrates another exemplary connected address book method.

FIG. 9 illustrates another exemplary connected address book method. While FIG. 9 illustrates exemplary steps according to one embodiment, other embodiments may omit, add to, reorder, and/or modify any of the steps shown in FIG. 9.

In step 910, contacts data for an address book listing associated with a user is maintained. Step 910 may be performed in any of the ways described above, including connected address book module 360 maintaining the contacts data in data store 330.

In step 920, data representative of a persona associated with the user is maintained. Step 920 may be performed in any of the ways described above, including profile management module 620 maintaining persona data 660 for the persona in data store 330.

In step 930, a request from another user to access the address book listing is received. Step 930 may be performed in any of the ways described above, including connected address book subsystem 610 receiving the request from an access device 125 over network 125.

In step 940, a select subset of the contacts data associated with the address book listing is identified in response to the request and based at least in part on the persona. Step 940 may be performed in any of the ways described above, including connected address book module 360 matching the other user to the persona specifying the select subset of the contacts data.

In step 950, the other user is provided with access to the select set of the contacts data. Step 950 may be performed in any of the ways described above, including transmitting data representative of the select set of the contacts data to an access device 120 over network 125.

One or more of the steps in FIG. 9 may be repeated. For example, step 920 may be repeated for one or more other personas associated with the user, and steps 930-940 may be repeated for other requests from other users.

One or more of the steps in FIG. 8 and one or more of the steps in FIG. 9 may be combined. In some embodiments, for example, certain steps in FIG. 9 (e.g., steps 920-950) may be appended to the steps in FIG. 8 and vice versa.

In the preceding description, various exemplary embodiments have been described with reference to the accompanying drawings. It will, however, be evident that various modifications and changes may be made thereto, and additional embodiments may be implemented, without departing from the scope of the invention as set forth in the claims that follow. For example, certain features of one embodiment described herein may be combined with or substituted for features of another embodiment described herein. The description and drawings are accordingly to be regarded in an illustrative rather than a restrictive sense.

What is claimed is:

1. A method comprising:

maintaining, by a server subsystem including at least one physical computing device, a network address book accessible over a network by users of a connected address book service;

maintaining, by said server subsystem, a network address book listing in said network address book, said network address book listing including contacts data representing contact information for a first user of said connected address book service, said contacts data provided by said first user to said network address book for access by other users of said connected address book service;

receiving, by said server subsystem from an access device over said network, a request, from a second user of said connected address book service, to preview a network address book status for a local address book listing that is included in a local address book maintained locally on said access device and that includes information about said first user of said connected address book service;

in response to said request:
  determining, by said server subsystem, that said network address book listing included in said network address book matches said local address book listing included in said local address book, and
  providing, by said server subsystem to said access device over said network, a notification indicating that said network address book includes said network address book listing that matches said local address book listing;

providing, by said server subsystem to said access device, a tool for use by said second user to selectively relinquish control of said local address book listing in said local address book to said network address book;

detecting, by said server subsystem, a selection by said second user to relinquish control of said local address book listing in said local address book to said network address book; and converting, by said server subsystem within said local address book and in response to said selection, said local address book listing from being said local address book listing under control of said local address book to said network address book listing under control of said network address book.

2. The method of claim 1, wherein said providing of said notification indicating that said network address book includes said network address book listing that matches said local address book listing comprises providing said notification for display in an address book view included in a graphical user interface.

3. The method of claim 1, wherein said converting of said local address book listing from being said local address book listing under control of said local address book to said network address book listing under control of said network address book comprises converting said local address book to a hybrid address book that includes said network address book listing and at least one other local address book listing.

4. The method of claim 1, further comprising:
  maintaining, by said server subsystem, data representative of a persona associated with said first user;
  receiving, by said server subsystem from said second user, a request to access said network address book listing for said first user; and
  identifying and providing, by said server subsystem, at least a subset of said contacts data included in said network address book listing in response to said request to access said network address book listing and based at least in part on said persona.

5. The method of claim 4, further comprising:
maintaining, by said server subsystem, data representative of another persona associated with said first user;
receiving, by said server subsystem from a third user, another request to access said network address book listing for said first user; and
identifying and providing, by said server subsystem, at least another subset of said contacts data included in said network address book listing in response to said another request to access said network address book listing and based at least in part on said another persona.

6. The method of claim 1, tangibly embodied as computer-executable instructions on at least one non-transitory computer-readable medium.

7. The method of claim 1, wherein said tool for use by said second user to selectively relinquish control of said local address book listing in said local address book to said network address book comprises a checkbox in a graphical user interface configured to be checked to select to individually relinquish control of said local address book listing in said local address book to said network address book.

8. The method of claim 7, wherein said providing of said tool for use by said second user to selectively relinquish control of said local address book listing in said local address book to said network address book comprises automatically populating said checkbox with a checkmark based on said determining that said network address book listing included in said network address book matches said local address book listing included in said local address book.

9. A method comprising:
  maintaining, by a server subsystem including at least one physical computing device, a network address book accessible over a network by users of a connected address book service;
  maintaining, by said server subsystem, a network address book listing for a first user of said connected address book service, said network address book listing identifying at least one of a plurality of personas associated with said first user, said at least one of said plurality of personas being configured by said first user to selectively control access by at least another user of said connected address book service to at least one select set of contacts data representing contact information provided by said first user to said network address book;
  receiving, by said server subsystem from an access device over said network, a request, from a second user of said connected address book service, to preview a network address book status for a local address book listing that is included in a local address book maintained locally on said access device and that includes information about said first user of said connected address book service;
  in response to said request:
    determining, by said server subsystem, that said network address book listing included in said network address book matches said local address book listing included in said local address book, and
    providing, by said server subsystem to said access device over said network, a notification indicating that said network address book includes said network address book listing that matches said local address book listing;
  providing, by said server subsystem to said access device, a tool for use by said second user to selectively relinquish control of said local address book listing in said local address book to said network address book;
  detecting, by said server subsystem, a selection by said second user to relinquish control of said local address book listing in said local address book to said network address book;
  converting, by said server subsystem within said local address book and in response to said selection, said local address book listing from being said local address book listing under control of said local address book to said network address book listing under control of said network address book;
  receiving, by said server subsystem after said converting said local address book listing to said connected address book listing, a request from said second user to access said network address book listing;
  identifying, by said server subsystem, a select set of said contacts data associated with said network address book listing in response to said request from said second user to access said network address book listing and based at least in part on said at least one of said plurality of personas associated with said first user; and providing, by said server subsystem, said second user with access to said select set of said contacts data.

10. The method of claim 9, further comprising:

receiving, by said server subsystem from a third user of said connected address book service, another request to access said network address book listing;

identifying, by said server subsystem, another select set of said contacts data associated with said network address book listing in response to said another request to access said network address book listing and based at least in part on another of said plurality of personas; and providing, by said server subsystem, said third user with access to said another select set of said contacts data.

11. The method of claim 9, wherein said providing of said access to said select set of said contacts data comprises providing said select set of said contacts data to said access device over said network.

12. The method of claim 9, wherein said at least one of said plurality of personas associated with said first user specifies an association between said second user and said select set of contacts data representing said contact information provided by said first user to said network address book.

13. A system comprising:

a data store that stores data representing a network address book that is accessible over a network by users of a connected address book service, said network address book including a network address book listing that includes contacts data representing contact information for a first user of said connected address book service, said contacts data provided by said first user to said network address book for access by other users of said connected address book service;

at least one processor; and a connected address book module that directs said at least one processor to:

detect a request, received over said network from an access device of a second user of said connected address book service, to preview a network address book status for a local address book listing that is included in a local address book maintained locally on said access device and that includes information about said first user of said connected address book service;

respond to said request by determining that said network address book listing included in said network address book matches said local address book listing included in said local address book and providing, to said access device over said network, a notification indicating that said network address book includes said network address book listing that matches said local address book listing;

provide, to said access device, a tool for use by said second user to selectively relinquish control of said local address book listing in said local address book to said network address book;

detect a selection by said second user to relinquish control of said local address book listing in said local address book to said network address book; and convert, within said local address book and in response to said selection, said local address book listing from being said local address book listing under control of said local address book to said network address book listing under control of said network address book.

14. The system of claim 13, wherein said connected address book module directs said at least one processor to provide said notification by directing said at least one processor to provide said notification for display in a local address book view included in a graphical user interface.

15. The system of claim 13, wherein said conversion, within said local address book, of said local address book listing from being said local address book listing under control of said local address book to said network address book listing under control of said network address book converts said local address book to a hybrid address book that includes said network address book listing and at least one other local address book listing.

16. A system comprising:

a connected address book module that maintains a network address book accessible over a network by users of a connected address book service, the network address book including a network address book listing for a first user of said connected address book service, said network address book listing including contacts data representing contact information provided by said first user to said network address book for selective access by other users of said connected address book service;

a profile management module that maintains data representative of a first user profile associated with said first user, said first user profile including data representative of a plurality of personas specifying a plurality of different sets of said contacts data; and at least one processor;

wherein said connected address book module directs said at least one processor to detect a request, received over said network from an access device of a second user of said connected address book service, to preview a network address book status for a local address book listing that is included in a local address book maintained locally on said access device and that includes information about said first user of said connected address book service, respond to said request by determining that said network address book listing included in said network address book matches said local address book listing included in said local address book and providing, to said access device over said network, a notification indicating that said network address book includes said network address book listing that matches said local address book listing, provide, to said access device, a tool for use by said second user to selectively relinquish control of said local address book listing in said local address book to said network address book, detect a selection by said second user to relinquish control of said local address book listing in said local address book to said network address book, convert, within said local address book and in response to said selection, said local address book listing from being said local address book listing under control of said local address book to said network address book listing under control of said network address book, detect, after said conversion of said local address book listing to said connected address book listing, a request from said second user to access said network address book listing, match, in response to said request from said second user to access said network address book listing, said second user to one of said personas, and provide said second user with access to one of said sets of contacts data specified by said matched persona.

17. The system of claim 16, wherein said profile management module provides at least one tool configured to facilitate user designation of at least a subset of said first user profile data for use by said connected address book module.

18. The system of claim 16, wherein said profile management module provides at least one tool configured to facilitate user definition of said plurality of personas.

* * * * *